US006923047B2

(12) United States Patent
Miyaki et al.

(10) Patent No.: US 6,923,047 B2
(45) Date of Patent: Aug. 2, 2005

(54) RESET SYSTEM FOR OUTBOARD ENGINE

(75) Inventors: Tomohiko Miyaki, Iwata (JP); Tadaaki Morikami, Hamamatsu (JP)

(73) Assignee: Suzuki Motor Corporation, Hamamatsu (JP)

( * ) Notice: Subject to any disclaimer, the term of this patent is extended or adjusted under 35 U.S.C. 154(b) by 136 days.

(21) Appl. No.: 10/271,566

(22) Filed: Oct. 17, 2002

(65) Prior Publication Data

US 2003/0115940 A1 Jun. 26, 2003

(30) Foreign Application Priority Data

Dec. 26, 2001 (JP) ....................................... 2001-394235

(51) Int. Cl.[7] ............................................... G01M 15/00
(52) U.S. Cl. ......................................................... 73/116
(58) Field of Search ............................. 440/1, 2, 7, 84; 123/198 D, 352, 41.31, 673; 340/539.3; 73/116

(56) References Cited

U.S. PATENT DOCUMENTS 3,696,282 A * 10/1972 Hirokawa et al. .......... 318/588
4,319,230 A * 3/1982 Fowler et al. ........... 340/539.3
4,708,669 A * 11/1987 Kanno et al. .................. 440/1
4,822,307 A * 4/1989 Kanno ........................... 440/1
5,230,643 A * 7/1993 Kanno ......................... 440/86
5,408,221 A * 4/1995 Carsella, Sr. et al. ....... 340/604
5,550,531 A * 8/1996 Little-Lowry ............ 340/573.6
5,586,535 A * 12/1996 Syomura .................... 123/352
6,116,971 A * 9/2000 Morikami ...................... 440/2
6,648,706 B2 * 11/2003 Kanno ......................... 440/84
6,655,343 B2 * 12/2003 Suzuki et al. ........... 123/198 D

FOREIGN PATENT DOCUMENTS

JP 8-201104 A 8/1996
JP 10-38605 A 2/1998
JP 2002-30913 A 1/2002
JP 3534588 B2 3/2004

* cited by examiner

*Primary Examiner*—Edward Lefkowitz
*Assistant Examiner*—Octavia Davis
(74) *Attorney, Agent, or Firm*—Nixon & Vanderhye, PC

(57) ABSTRACT

A reset system for a watercraft outboard engine comprises: a control unit comprising a time summating portion for summating time for management of oil change time of an engine, a memory portion having a non-volatile memory such as an EEPROM for memorizing the cumulative time when the engine remains off and a determining portion for determining whether the cumulative time exceeds a set time by comparing the stored cumulative time with the set time; a warning portion for giving warning based on the comparison result when the cumulative time exceeds the set time; and a reset information entry portion for permitting reset information for clearing memory of the cumulative time in the memory and setting it into the initial value. The reset system can make control of the watercraft outboard engine based on the cumulative time.

10 Claims, 4 Drawing Sheets

The control unit is activated by the battery power source when the engine SW is turned on even when the engine remains off Battery-powered Configuration The control unit is activated by the battery power source when the engine SW is turned on even when the engine remains off Battery–powered Configuration A voltage is generated across the coil by start of the engine and the control unit is activated by the generated voltage as its power source.

Coil-powered Configuration

Reset imformation (example) : the emergency SW is turned on 5 times within 10 seconds Reset Information Control unit power supply ON Data can be reset only when entry of reset imformation is made within 30 seconds (for example) after the power supply to the control unit is turned on.

Reset effective time

RESET SYSTEM FOR OUTBOARD ENGINE

BACKGROUND OF THE INVENTION (1) Field of the Invention

The present invention relates to a reset system for outboard engines for small crafts, water bikes and the like, which allows for resetting of predetermined control data such as oil change time, etc.

(2) Description of the Prior Art

The oil change time display function provided for an outboard is to inform the user of the proper time for changing oil. This function will warn the user of the time for changing oil using an LED or buzzer when the cumulative run time from the last oil change exceeds the standard oil change time designated in advance, by continuously comparing the former with the latter. It is therefore necessary after changing oil to reset the operating time data, stop the LED warning or buzzer warning and restart the integration of operating time in order to estimate the next oil change time.

However, the conventional outboard motors have no well-established way of resetting control data for maintenance. It is necessary to implement a test operation of the outboard motor before shipment and reset the integrated time data for changing oil after an oil change work has been performed or the like, on the market side which includes dealers, shops and maintenance workshops, or by user's side.

Therefore, it has not been easy for dealers and others to implement a resetting operation and hence the conventional configuration has the drawback in that control for maintenance is constrained. Further, provision of an extra switch for the resetting operation gives rise to a cost disadvantage.

As seen in Japanese Patent Application Laid-open Hei 10 No.38605, data reset for resetting the cumulative time for management of the engine oil and the like in an overland vehicle is implemented by input of reset information through an individual reset button. Since an outboard motor is used on a boat and hence must be compact, the outboard needs to be configured so that it can be operated as simply as possible without any increase in the number of parts. However, no such a configuration has been proposed up to now in the outboard field.

Further, in an outboard engine which memorizes the information of sensor trouble and displays the fact of the sensor trouble when a sensor on the engine malfunctions, the display of the sensor trouble will continue even after the user's cognition of the trouble until the sensor is repaired. So the display comes to be troublesome, and there has been no way of removing the confusion, or resetting the trouble information.

SUMMARY OF THE INVENTION

The present invention has been devised in view of the above prior art inconveniences, it is therefore an object of the present invention to provide a reset system for an outboard engine, which allows simple resetting of time data for maintenance or trouble data, by a user or by those in the market.

In order to achieve the above object, the present invention is configured as follows:

In accordance with the first aspect of the present invention, a reset system for an outboard engine, includes:

a time summating means for summating the operation time of the engine for control of a predetermined factor;

a memory means for storing the cumulative time while the engine remains off;

a determining means which compares the stored cumulative time with a set value and determines whether the cumulative time exceeds the set time;

a warning means for providing warning when the cumulative time exceeds the set time, based on the comparison result; and a reset information entry means for permitting entry of reset information which clears memory of the cumulative time stored in the memory means and setting it into the initial value, and is characterized in that the outboard engine can be controlled based on the cumulative time.

In accordance with the second aspect of the present invention, the reset system for an outboard engine having the above first feature is characterized in that the reset information entry means comprises an existing switch of the outboard, and entry of reset information can be made by operating the switch under predetermined conditions.

In accordance with the third aspect of the present invention, the reset system for an outboard engine having the above first feature is characterized in that the outboard engine is one which uses a battery as a power source thereof, and entry of reset information is restricted while the engine runs.

In accordance with the fourth aspect of the present invention, the reset system for an outboard having the above first feature is characterized in that the outboard engine is one which uses a generator as a power source thereof, and the reset information entry means enables entry of reset information to be made through a switch which will not cause any adverse effect on the engine even if the switch is repeatedly turned on and off while the engine runs.

In accordance with the fifth aspect of the present invention, the reset system for an outboard engine having the above first feature is characterized in that permissible entry time for reset information is constrained after the power source is activated.

In accordance with the sixth aspect of the present invention, the reset system for an outboard engine having the above first feature is characterized in that a specified number of ONs and OFFs repeated within a specified period of time is defined as the reset information for the reset information entry means.

In accordance with the seventh aspect of the present invention, the reset system for an outboard engine having the above first feature is characterized in that the switches for the reset information entry means are related to the pieces of data wanted to be reset.

In accordance with the eighth aspect of the present invention, the reset system for an outboard engine having the above first feature is characterized in that the state of the reset information entry means during the last operation of the engine is stored, and when the state of the reset information entry means at the current engine start changes from the previously stored state, the system determines that entry of reset information has been made.

In accordance with the ninth aspect of the present invention, the reset system for an outboard engine having the above first feature is characterized in that the reset information entry means is arranged near the part associated to the data to be reset.

DESCRIPTION OF THE PREFERRED EMBODIMENTS

The embodiments of the present invention will hereinafter be described in detail with reference to the accompanying drawings.

Figure 1:
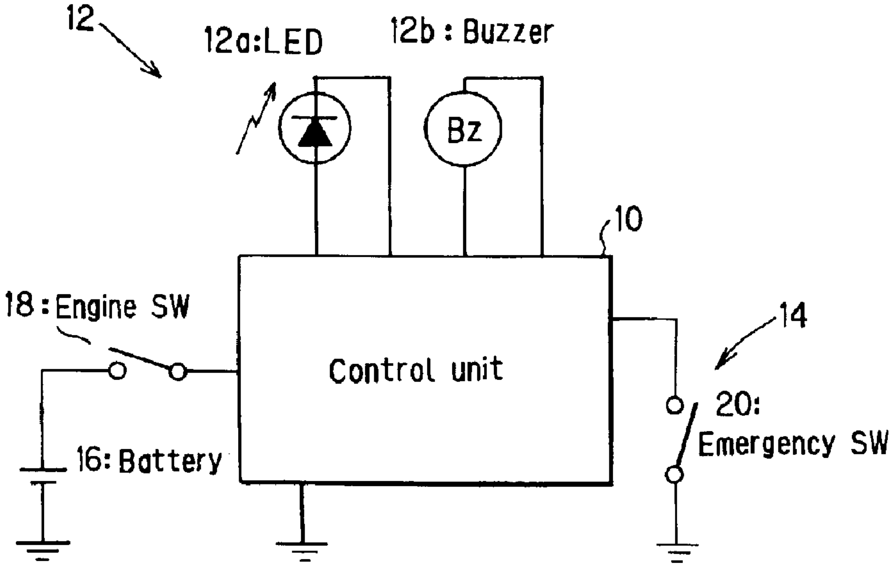
FIG. 1 is an illustrative view showing a control unit based on a power source battery in accordance with the first embodiment of the present invention.

FIG. 1 is an illustrative view of a reset system for resetting cumulative time as to predetermined control data of an outboard engine, in accordance with the first embodiment of the present invention. In the first embodiment, reset of cumulative data for oil change time for an outboard motor will be explained as the cumulative time as to predetermined control data. However, the present invention can be applied to any type of data (time control data) needing to be reset, it being understood that oil change is but one example of an engine-associated event for which the reset system may be utilized.

The first embodiment, as shown in FIG. 1, is a reset system for a watercraft outboard engine, which comprises: a control unit 10 made up of a time summating portion for summating time for management of oil change time of an engine, a memory portion having a non-volatile memory such as an EEPROM for memorizing the cumulative time when the engine remains off and a determining portion for determining whether the cumulative time exceeds a set time by comparing the stored cumulative time with the set time; a warning portion 12 for giving warning based on the comparison result when the cumulative time exceeds the set time; and a reset information entry portion 14 for permitting reset information for clearing memory of the cumulative time in the memory means and setting it into the initial value and which can make control of the watercraft outboard engine based on the cumulative time.

Specifically, the operating time from the last oil change is added up from the moment the last reset was made, and the cumulative time is stored in the built-in non-volatile memory. The thus stored cumulative time is continually compared with the standard oil change time designated in advance. When the cumulative time exceeds the standard time, the user is informed or warned by warning portion 12 of lighted or flashing LED (light emitting diode) 12*a*, buzzing buzzer 12*b*, or the like, of the fact that the oil change time is reached.

In this configuration, it is necessary to reset the operating time data, added up after the oil change, stop the warning of LED 12*a* or buzzer 12*b* and restart the summation of operating time for a next oil change.

Here, since the control unit 10 of the first embodiment shown in FIG. 1 includes a battery 16 as its power source, it is possible for a medium or large-sized outboard engine to actuate control unit 10 to recognize the information only if the engine switch, designated at 18, is turned on even when the engine remains off.

Therefore, after completion of changing oil, with engine switch 18 turned on, the predetermined reset information is input to control unit 10 through an existing switch (e.g., a switch having employment also for a function other than reset, such as an emergency switch 20 or the like), and the operating time data can be reset. According to the outboard motor with a power source battery, since the resetting work can be done while the engine is off, it is possible to implement reliable resetting.

Further, use of an existing switch enables resetting of the operating time without providing an extra reset switch. Accordingly, it is not necessary to consider switch positioning and wire routing, therefore the number of steps can be reduced and the cost required for the switch, fixing brackets, wire and the like can be cut.

Figure 2A:
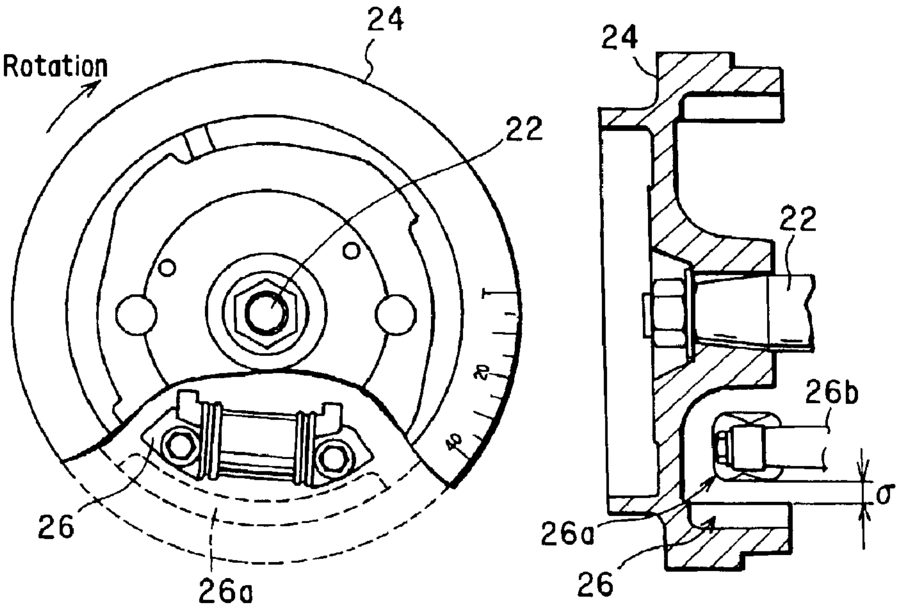
FIGS. 2A and 2B are structural and circuit diagrams for illustrating a control unit based on a power source generator in accordance with the second embodiment of the present invention.
Figure 2B:
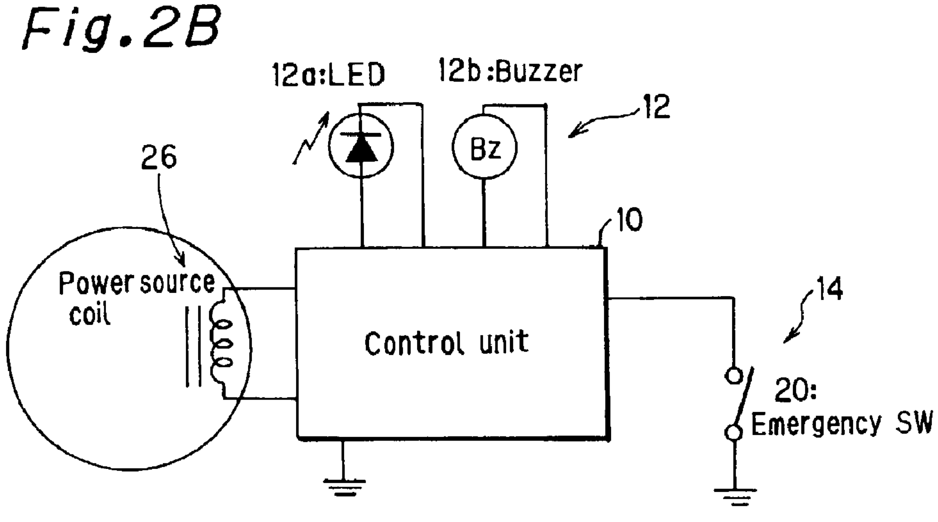

As shown in FIG. 2A, in a small-sized outboard motor having no power source battery 16 according to the second embodiment, a flywheel 24 coupled to an engine crankshaft 22 starts rotating together as the engine starts and a magnet 26*a* set at the inner periphery of flywheel 24 passes by the vicinity of a coil 26 fixed to the cylinder (by means of a cylinder attachment boss 26*b*), with a fixed gap $\sigma$ away from the coil so as to generate a voltage across coil 26. This generated voltage is supplied to control unit 10 as its power source, as shown in FIG. 2B. Accordingly, it is not possible to make control unit 10 recognize the information unless the engine is started.

After completion of changing oil, the engine is started and the operating time data is reset by entry of reset information to the unit through a switch such as an emergency switch 20 or the like, which will not cause any adverse effect on the engine operation even if it is operated while the engine runs. In the case where emergency switch 20 is used, the engine will repeat misfiring and firing during the resetting task, but this will not cause any deficiency to the engine and the user. In case the engine stops during the resetting operation, the resetting task can be made once again after restarting. Further, since use of a switch (such as emergency switch 20 or the like), which will not cause any adverse effect on the engine operation even if it is operated while the engine runs, enables reliable resetting. This configuration can be applied to various types of outboard motors.

Figure 3:
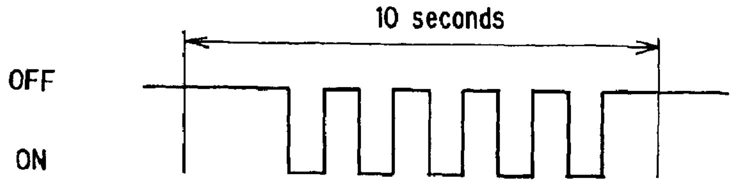
FIG. 3 is a chart illustrating an example of reset information.

The reset information should be determined as a specified number of ONs and OFFs repeated within a specified period of time, which will never occur in normal use. For example, the emergency switch being turned on five times within 10 seconds as shown in FIG. 3 may be defined as the requirement of the reset information. In this way, it is possible to determine such a setup that no resetting will occur during normal operation.

Figure 4:
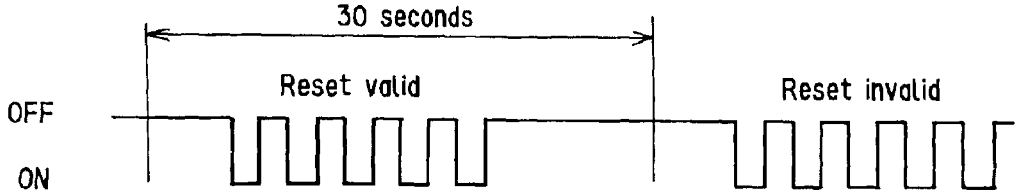
FIG. 4 is a chart illustrating reset effective time.

In an outboard motor having power source battery 16 as shown in FIG. 1, it is preferred that an effective period of time should be provided after the switch is turned on. For example, as shown in FIG. 4, it is possible to configure a system so that data can be reset only when the reset information is input within 30 seconds after power supply from the battery to control unit 10 is activated by engine switch 18 being turned on.

Also in the case of an outboard motor using power source coil 26 as its power source as shown in FIGS. 2A and 2B, it is preferred that an effective period of time for resetting is provided after the engine start. By this arrangement, it is possible to prohibit entry of reset information during the engine running and hence prevent erroneous entry of reset information during the engine running.

In the above cases, since the fact that the resetting task ends correctly can be confirmed from the extinction of the warning from the warning portion 12 (LED 12*a* and buzzer 12*b*) as shown in FIGS. 1, 2A and 2B, it is possible for the user to positively know that the data reset has been completed.

In the case where there are other pieces of data wanted to be reset than the data as to oil change time, it is possible to reset a multiple number of data without restraint by relating the associated pieces of data wanted to be reset to different switches: for example, the data as to oil change time can be reset when entry of information is made through the emergency switch while a piece of data other than that as to oil change time can be reset when entry of information is made through the idle switch, for example.

Figure 5:
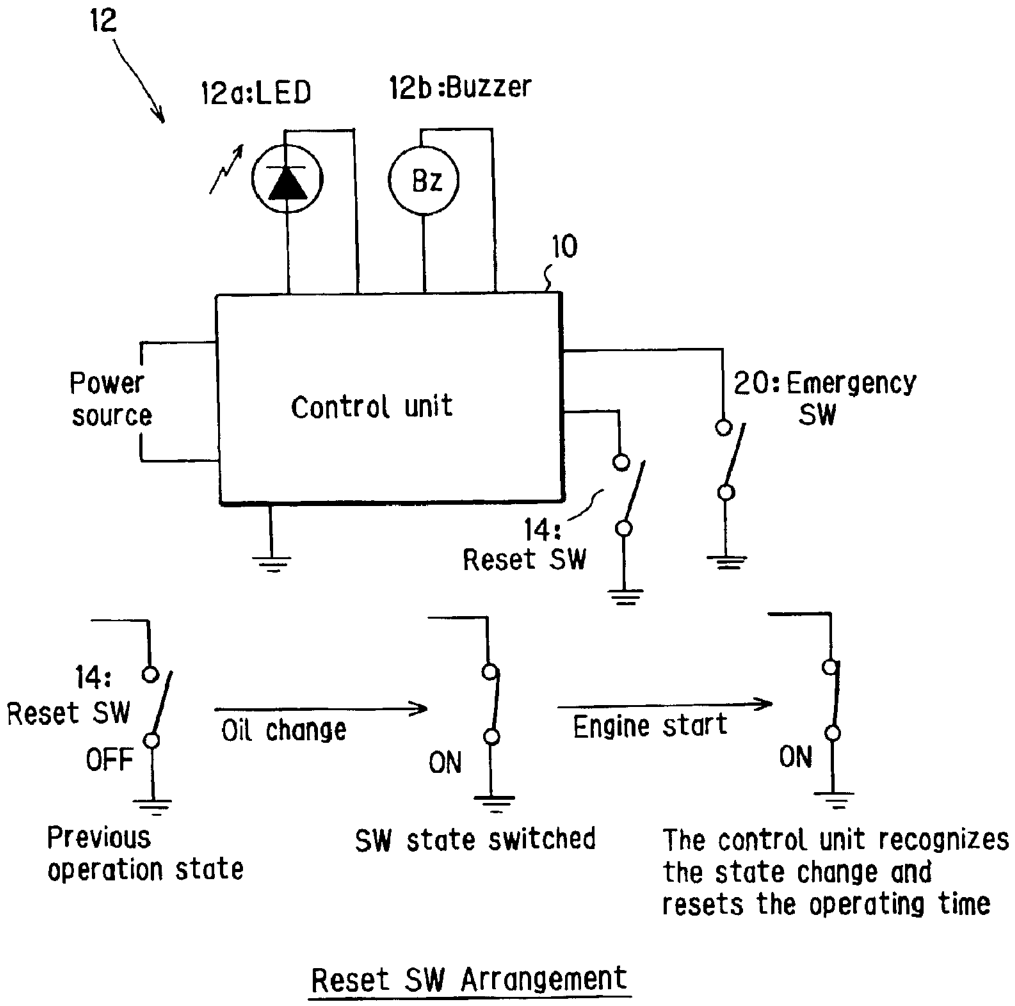
FIG. 5 is an illustrative diagram showing a reset switch arrangement.

Other than the method of using existing switches, there is another method of resetting data as follows. That is, as shown in FIG. 5, the state of the reset switch (open or short-circuited state) at the previous operation has been stored, and the state of the reset switch is checked when the control unit is actuated. If the current state differs from that at the previous operation (the state has changed from the open state to the short-circuited state or from the short-circuited state to the open state), the data is reset. In this system, since the switch state is checked when the ignition switch is turned on (when the battery power source is activated), the system will never be affected by noise or power reduction during operation or other deficiencies. Further, since a user is needed to operate the switch only one time after changing oil, it is possible to reset the data in a simple manner.

Since, according to this method, even with a small-sized type having no battery, the data can be reset when electric power is supplied from the generator coil after the start of operation, the resetting task can be easily done when the oil is changed while the outboard or the like is kept on land or while it is maintained in the off-season. In the case where this function is not provided, it is necessary to start the engine in order to obtain power supply, hence it is necessary to carry the outboard motor onto the water, or into a water tank. If the outboard motor is configured with a unit which is adapted to a battery or other power supply, there is still an inconvenience that the outboard needs to be connected to an external battery or other power supply. In contrast, the above configuration is able to avoid these drawbacks by a simple mechanism.

Since the operator must touch the oil filler port or oil level gauge when changing oil, it is possible to prevent the operator from forgetting to change over the reset switch when the reset switch is arranged near the oil filler port or oil level gauge.

In connection with the above configuration, the reset information entry means should not be limited to dedicated or existing switches, but information entry may be performed by changeover between wire connection and disconnection.

Here, it should be noted that the present invention can be applied to resetting of information as to failure of a sensor, other than resetting of the cumulative time based on which changing oil or another task is warned as above. In the conventional configuration, the failure information of a sensor is stored and displayed continuously until repair of the sensor is completed. Therefore, the display used to be annoying. Use of the present invention makes it possible to reset the information when the failure is confirmed, whereby it becomes easy to know whether or not repair of the failure is finished. Further, since resetting of data can be performed regardless of presence of the battery, the diagnosis system, which has been adopted for engines of fuel injection type only, can be applied to small-sized carburetor models. Thus, it is possible to improve the maintainability of the engine.

As has been described heretofore, according to the present invention, data reset control of cumulative time data and failure data, which has not been well-organized in the conventional outboards, can be established.

Further, according to the present invention, since entry of reset information can be made using an existing switch as the reset information entry means, it is possible to cut the number of steps and cost required for provision of a switch.

According to the present invention, since entry of reset information can be made while the engine remains off, it is possible to positively perform reset of data without any deficiency.

According to the present invention, since entry of reset information can be made through a switch which will not cause any adverse effect on the engine even if the switch is repeatedly turned on and off while the engine runs, it is possible to implement the resetting operation without any deficiency toward engine operation. Accordingly, the present invention can be applied to outboard engines of any type, from compact to large-sized types.

According to the present invention, since input time restriction is imposed after the power source is activated so that entry of information during the engine operation after lapse of the permissible entry time is prohibited, it is possible to prevent erroneous entry of reset information.

According to the present invention, since the reset information is determined to be a specified number of ONs and OFFs repeated within a specified period of time, which will never occur in normal use, it is possible to avoid erroneous operation in normal use.

According to the present invention, since the pieces of data wanted to be reset are related to individual switches, it is possible to reset multiple pieces of data.

According to the present invention, since the reset state is checked when the engine is started, no erroneous reset will occur due to noise or reduction in power supply while the engine runs.

According to the present invention, since each reset switch is arranged near the switch of the associated data, it is possible to prevent the operator from forgetting to change over the switch.

What is claimed is:

1. A reset system for an outboard engine, comprising:

a time summating means for summating cumulative operation time of the engine for control of a predetermined factor;

a memory means for storing the cumulative operation time while the engine remains off;

a determining means which compares the stored cumulative operation time with a set value and which determines whether the cumulative operation time exceeds the set value;

a warning means for providing a warning when the cumulative operation time exceeds the set value, based on a comparison result; and a reset information entry means for permitting entry of reset information which initializes the cumulative operation time stored in the memory means, wherein the reset information entry means comprises an existing switch of the outboard engine, the existing switch also having employment for a function other than for permitting the entry of the reset information;

wherein the outboard engine is controlled based on the cumulative operation time.

2. The reset system for an outboard engine according to claim 1, wherein the entry of the reset information can be made by operating the switch under predetermined conditions.

3. The reset system for an outboard engine according to claim 1, wherein the outboard engine uses a battery as a power source and the entry of the reset information is restricted while the engine runs.

4. The reset system for an outboard engine according to claim 1, wherein the outboard engine uses a generator as a power source and the reset information entry means enables the entry of the reset information to be made through the switch and does not cause any adverse effect on the engine even if the switch is repeatedly turned on and off while the engine runs.

5. The reset system for an outboard engine according to claim 1, wherein time for permitting the entry of the reset information is constrained a predetermined time after the power source is activated.

6. The reset system for an outboard engine according to claim 1, wherein a specified number of ON and OFF actuations of the reset information entry means within a specified period of time is defined as the reset information for the reset information entry means.

7. The reset system for an outboard engine according to claim 1, wherein the reset information entry means comprises plural existing switches respectively associated with different pieces of data to be reset.

8. A reset system for an outboard engine, comprising:

a time summating means for summating cumulative operation time of the engine for control of a predetermined factor;

a memory means for storing the cumulative operation time while the engine remains off;

a determining means which compares the stored cumulative operation time with a set value and which determines whether the cumulative operation time exceeds the set value;

a warning means for providing a warning when the cumulative operation time exceeds the set value, based on comparison result; and a reset information entry means for permitting entry of reset information which initializes the cumulative operation time stored in the memory means, wherein a previously stored state of reset information entry means during a last operation of the engine is stored, and when a state status of the reset information entry means at an engine start changes from the previously stored state, the system determines that entry of reset information has been made.

9. The reset system for an outboard engine according to claim 1, wherein the reset information entry means is arranged near a part of the outboard engine affected by the predetermined factor.

10. A reset system for an outboard engine, comprising:

a memory for storing a cumulative operation time of the engine even while the engine remains off;

a controller which compares the stored cumulative operation time with a set value and which determines whether the cumulative operation time exceeds the set value;

a warning indicator which provides a warning when the cumulative operation time exceeds the set value, based on a comparison result; and a reset switch for permitting entry of reset information which initializes the cumulative operation time stored in the memory means, wherein the reset switch comprises an existing switch of the outboard engine, the existing switch also having employment for a function other than for permitting the entry of the reset information;

wherein the outboard engine is controlled based on the cumulative operation time.

* * * * *